US011082780B2

(12) United States Patent
Kavalekalam et al.

(10) Patent No.: US 11,082,780 B2
(45) Date of Patent: *Aug. 3, 2021

(54) KALMAN FILTERING BASED SPEECH ENHANCEMENT USING A CODEBOOK BASED APPROACH

(71) Applicant: GN HEARING A/S, Ballerup (DK)

(72) Inventors: Mathew Shaji Kavalekalam, Ballerup (DK); Mads Graesboll Christensen, Ballerup (DK); Fredrik Gran, Ballerup (DK); Jesper B. Boldt, Ballerup (DK)

(73) Assignee: GN Hearing A/S

( * ) Notice: Subject to any disclaimer, the term of this patent is extended or adjusted under 35 U.S.C. 154(b) by 0 days.

This patent is subject to a terminal disclaimer.

(21) Appl. No.: 16/402,837

(22) Filed: May 3, 2019

(65) Prior Publication Data

US 2019/0261098 A1 Aug. 22, 2019

Related U.S. Application Data

(63) Continuation of application No. 15/438,388, filed on Feb. 21, 2017, now Pat. No. 10,284,970.

(30) Foreign Application Priority Data

Mar. 11, 2016 (EP) .................................... 16159858

(51) Int. Cl.
*H04R 25/00* (2006.01)
*H04B 15/00* (2006.01)
(Continued)

(52) U.S. Cl.
CPC ........ *H04R 25/505* (2013.01); *G10L 21/0208* (2013.01); *H04R 1/1083* (2013.01);
(Continued)

(58) Field of Classification Search
CPC ..... H04R 2225/41; G10L 19/06; G10L 19/09; G10L 19/12; G10L 2019/0002; G10L 2019/0011; G10L 2019/0016
(Continued)

(56) References Cited

U.S. PATENT DOCUMENTS

| | | | |
|---|---|---|---|
| 5,749,065 A | 5/1998 | Nishiguchi |
| 6,615,174 B1 | 9/2003 | Arslan |
| 2007/0276655 A1 | 11/2007 | Lee et al. |
| 2009/0103743 A1 | 4/2009 | Honda |

(Continued)

FOREIGN PATENT DOCUMENTS

JP 2010114897 A 5/2010

OTHER PUBLICATIONS

Extended European Search Report dated Sep. 12, 2016 for corresponding EP Patent Application No. 16159858.6, 6 pages.

(Continued)

*Primary Examiner* — George C Monikang
(74) *Attorney, Agent, or Firm* — Vista IP Law Group, LLP

(57) ABSTRACT

A hearing device for enhancing speech intelligibility, the hearing device includes: an input transducer for providing an input signal comprising a speech signal and a noise signal; a processing unit; an acoustic output transducer coupled to the processing unit, the acoustic output transducer configured to provide an audio output signal based on an output signal form the processing unit; wherein the processing unit is configured to determine one or more parameters of the input signal based on a codebook based approach (CBA) processing; and wherein the processing unit is configured to perform a Kalman filtering of the input signal based on the determined one or more parameters so that the output signal has an enhanced speech intelligibility.

21 Claims, 5 Drawing Sheets

(51) Int. Cl.

| | |
|---|---|
| ***G10L 21/0232*** | (2013.01) |
| ***G10L 15/02*** | (2006.01) |
| ***H04R 1/10*** | (2006.01) |
| ***G10L 21/0208*** | (2013.01) |
| *G10L 25/12* | (2013.01) |

(52) U.S. Cl.
CPC ............ *H04R 25/552* (2013.01); *G10L 25/12* (2013.01); *H04R 2201/107* (2013.01); *H04R 2225/43* (2013.01)

(58) Field of Classification Search
USPC ............... 381/94.1, 94.2, 94.7; 704/200, 219
See application file for complete search history.

(56) References Cited

U.S. PATENT DOCUMENTS

| | | | |
|---|---|---|---|
| 2009/0161882 | A1 | 6/2009 | Le Faucher |
| 2010/0266152 | A1 | 10/2010 | Rosenkranz |
| 2014/0328487 | A1 | 11/2014 | Hiroe |
| 2016/0255446 | A1 | 9/2016 | Bernardi |

OTHER PUBLICATIONS

Krishnan, Venkatesh, et al., "Noise Robust Aurora-2 Speech Recognition Employing a Codebook-Constrained Kalman Filter Preprocessor", Acoustics, Speech and Signal Processing, 2006. ICASSP 2006 Proceedings. 2006 IEEE France May 14-19, 2006, Piscataway, NJ, USA, IEEE, May 14, 2006, 4 pages.

Non-Final Office Action dated Jul. 27, 2017 for related U.S. Appl. No. 15/438,388.

Final Office Action dated Dec. 1, 2017 for related U.S. Appl. No. 15/438,388.

Advisory Action dated Mar. 8, 2018 for related U.S. Appl. No. 15/438,388.

Non-Final Office Action dated May 3, 2018 for related U.S. Appl. No. 15/438,388.

Notice of Allowance and Fee(s) dated Dec. 14, 2018 for related U.S. Appl. No. 15/438,388.

Foreign Office Action dated Jan. 19, 2021 for related Japanese Appin. No. 2017-029379.

Krishnan, Venkatesh, et al. "Noise robust Aurora-2 speech recognition employing a codebook-constrained Kalman 'filter preprocessor." 2006 IEEE International Conference on Acoustics Speech and Signal Processing Proceedings. vol. 1. IEEE, 2006.

KALMAN FILTERING BASED SPEECH ENHANCEMENT USING A CODEBOOK BASED APPROACH

RELATED APPLICATION DATA

This application is a continuation of U.S. patent application Ser. No. 15/438,388 filed on Feb. 21, 2017, pending, which claims priority to and the benefit of European Patent Application No. EP 16159858.6 filed on Mar. 11, 2016, pending. The entire disclosure of the above application is expressly incorporated by reference herein.

FIELD

The present disclosure relates to a method and a hearing device for enhancing speech intelligibility. The hearing device comprising an input transducer for providing an input signal comprising a speech signal and a noise signal, and a processing unit configured for processing the input signal, wherein the processing unit is configured for performing a codebook based approach processing on the input signal.

BACKGROUND

Enhancement of speech degraded by background noise has been a topic of interest in the past decades due to its wide range of applications. Some of the important applications are in digital hearing aids, hands free mobile communications and in speech recognition devices. The objectives of a speech enhancement system are to improve the quality and intelligibility of the degraded speech. Speech enhancement algorithms that have been developed can be mainly categorised into spectral subtraction methods, statistical model based methods and subspace based methods. Conventional single channel speech enhancement algorithms have been found to improve the speech quality, but have not been successful in improving the speech intelligibility in presence of non-stationary background noise. Babble noise, which is commonly encountered among hearing aid users, is considered to be highly non-stationary noise. Thus, an improvement in speech intelligibility in such scenarios is highly desirable.

SUMMARY

There is a need for improved speech intelligibility in hearing devices, for example in the presence of non-stationary background noise.

Disclosed is a hearing device for enhancing speech intelligibility. The hearing device comprises an input transducer for providing an input signal comprising a speech signal and a noise signal. The hearing device comprises a processing unit configured for processing the input signal. The hearing device comprises an acoustic output transducer coupled to an output of the processing unit for conversion of an output signal form the processing unit into an audio output signal. The processing unit is configured for performing a codebook based approach processing on the input signal. The processing unit is configured for determining one or more parameters of the input signal based on the codebook based approach processing. The processing unit is configured for performing a Kalman filtering of the input signal using the determined one or more parameters. The processing unit is configured to provide that the output signal is speech intelligibility enhanced due to the Kalman filtering.

Also disclosed is a method for enhancing speech intelligibility in a hearing device. The method comprises providing an input signal comprising a speech signal and a noise signal. The method comprises performing a codebook based approach processing on the input signal. The method comprises determining one or more parameters of the input signal based on the codebook based approach processing. The method comprises performing a Kalman filtering of the input signal using the determined one or more parameters. The method comprises providing that an output signal is speech intelligibility enhanced due to the Kalman filtering.

The method and hearing device as disclosed provides that the output signal in the hearing device is enhanced or improved in terms of speech intelligibility, also in presence of non-stationary background noise. Thus the user of the hearing device will receive or hear an output signal where the intelligibility of the speech is improved. This is an advantage, in particular in presence of non-stationary background noise, such as babble noise, which is commonly encountered among for example hearing aid users.

The output signal is speech intelligibility enhanced because a Kalman filtering of the input signal is performed. In order to perform the Kalman filtering, one or more parameters, of the input signal, to be used as input to the Kalman filtering should be determined. These one or more parameters are determined by performing a codebook based approach processing of the input signal.

The enhanced or improved speech intelligibility may be evaluated by means of objective measures such as short term objective intelligibility (STOI) and Segmental signal-to-noise ratio (SegSNR) and Perceptual Evaluation of Speech Quality (PESQ).

The input signal $z(n)$ may be called a noisy signal $z(n)$ as it comprises both noise and speech. Thus the input signal comprises a speech signal $s(n)$ which may be called a clean speech signal $s(n)$. The input signal $z(n)$ also comprises a noise signal $w(n)$. The speech signal may be called a speech part of the input signal. The noise signal may be called a noise part of the input signal. The noise signal or noise part of the input signal may be background noise, such as non-stationary background noise, such as babble noise.

Accordingly, the codebook may comprise a noise codebook and/or a speech codebook. The noise codebook may be generated, e.g. by training the codebook, by recording in noisy environments, such as e.g. traffic noise, cafeteria noise, etc. Such noisy environments may be considered or constitute background noise. By these recordings in noisy environments, spectra of for example 20-30 milliseconds (ms) of noise may be obtained.

The speech codebook may be generated, e.g. by training the codebook, by recording speech from people.

The codebook, e.g. the speech codebook, may be a speaker specific codebook or a generic codebook. The speaker specific codebook may be trained by recording speech from people which the user often talks to. The speech may be recorded under ideal conditions, such as with no background noise. Hereby spectra of e.g. 20-30 ms of speech may be obtained.

The hearing device may be a digital hearing device. The hearing device may be a hearing aid, a hands free mobile communication device, a speech recognition device etc.

The input transducer may be a microphone. The output transducer may be a receiver or loudspeaker.

The Kalman filter used in the Kalman filtering of the input signal may be a single channel Kalman filter or a multi channel Kalman filter.

The one or more parameters may be parameters of the spectral envelope defining the form of the spectra.

The one or more parameters may comprise or may be Linear Prediction Coefficients (LPC) and/or short term predictor (STP) parameters and/or autoregressive (AR) parameters. The Linear Prediction Coefficients along with the excitation variance may comprise or may be called short term predictor (STP) parameters and/or autoregressive (AR) parameters.

In some embodiments the input signal is divided into one or more frames, where the one or more frames may comprise primary frames representing speech signals, and/or secondary frames representing noise signals and/or tertiary frames representing silence. A noise codebook may be used for the secondary frames representing noise signals. A speech codebook may be used for primary frames representing speech signals.

In some embodiments the one or more parameters comprise short term predictor (STP) parameters. Thus the parameters may generally be called short term predictor (STP) parameters. Autoregressive parameters may be short term predictor (STP) parameters. Linear Prediction Coefficients (LPC) may be short term predictor (STP) parameters or may be comprised in the short term predictor (STP) parameters.

In some embodiments the one or more parameters comprises one or more of:

a first parameter being a state evolution matrix C(n) comprising of speech Linear Prediction Coefficients (LPC) and noise Linear Prediction Coefficients (LPC), a second parameter being a variance of a speech excitation signal $\sigma_u^2$ (n), and/or a third parameter being a variance of a noise excitation signal $\sigma_v^2$ (n).

In some embodiments the one or more parameters are assumed to be constant over frames of 20 milliseconds. The usage of a Kalman filter in a speech enhancement may require the state evolution matrix C(n), consisting of the speech Linear Prediction Coefficients (LPC) and noise Linear Prediction Coefficients (LPC), variance of speech excitation signal $\sigma^2_u(n)$ and variance of the noise excitation signal $\sigma^2_v(n)$ to be known. These parameters may be assumed to be constant over frames of 25 milliseconds (ms) due to the quasi-stationary nature of speech.

In some embodiments determining the one or more parameters comprises using an a priori information about speech spectral shapes and/or noise spectral shapes stored in a codebook, used in the codebook based approach processing, in the form of Linear Prediction Coefficients (LPC). A noise codebook may comprise the noise spectral shapes and a speech codebook may comprise the speech spectral shapes.

In some embodiments the codebook, used in the codebook based approach processing, is a generic speech codebook or a speaker specific trained codebook. The generic codebook may also be made more specific, such as providing a generic female speech codebook, and/or a generic male speech codebook, and/or a generic child speech codebook. Thus if an input spectra from a person speaking is not recognized by the processing unit as corresponding to a specific person for which a speaker specific trained codebook exists, but is recognized as a female speaker, then a generic female speech codebook may be selected by the processing unit. Correspondingly, if the input spectra from a person speaking is not recognized by the processing unit as corresponding to a specific person for which a speaker specific trained codebook exists, but is recognized as a male speaker, then a generic male speech codebook may be selected by the processing unit. And if the input spectra from a person speaking is not recognized by the processing unit as corresponding to a specific person for which a speaker specific trained codebook exists, but is recognized as a child speaker, then a generic child speech codebook may be selected by the processing unit.

In some embodiments the speaker specific trained codebook is generated by recording speech of specific persons relevant to a user of the hearing device under ideal conditions. The specific persons may be people who the hearing device user often talks to, such as close family, e.g. spouse, children, parents or siblings, and close friends and colleagues. The ideal conditions may be conditions with no background noise, no noise at all, good reception of speech etc. The codebook may be generated by recording and saving spectra over 20-30 ms, which may be sounds or pieces of sounds, which may be the smallest part of a sound to provide a spectral envelope for each specific person or speaker.

In some embodiments the codebook, used in the codebook based approach processing, is automatically selected. In some embodiments the selection is based on a spectrum or on spectra of the input signal and/or based on a measurement of short term objective intelligibility (STOI) for each available codebook. Thus if the input spectra from a person speaking is recognized by the processing unit as corresponding to a specific person for which a speaker specific trained codebook exists, then this speaker specific trained codebook may be selected by the processing unit. If the input spectrum or spectra from a person speaking is/are not recognized by the processing unit as corresponding to a specific person for which a speaker specific trained codebook exists, then the generic codebook may be selected by the processing unit. If the input spectrum or spectra from a person speaking is/are not recognized by the processing unit as corresponding to a specific person for which a speaker specific trained codebook exists, but is recognized as a female speaker, then a generic female speech codebook may be selected by the processing unit. Correspondingly, if the input spectrum or spectra from a person speaking is/are not recognized by the processing unit as corresponding to a specific person for which a speaker specific trained codebook exists, but is recognized as a male speaker, then a generic male speech codebook may be selected by the processing unit. And if the input spectrum or spectra from a person speaking is/are not recognized by the processing unit as corresponding to a specific person for which a speaker specific trained codebook exists, but is recognized as a child speaker, then a generic child speech codebook may be selected by the processing unit.

In some embodiments the Kalman filtering comprises a fixed lag Kalman smoother providing a minimum mean-square estimator (MMSE) of the speech signal.

In some embodiments the Kalman smoother comprises computing an a priori estimate and an a posteriori estimate of a state vector and error covariance matrix of the input signal.

In some embodiments a weighted summation of short term predictor (STP) parameters of the speech signal is performed in a line spectral frequency (LSF) domain. The weighted summation of short term predictor (STP) parameters or of autoregressive (AR) parameters should preferably be performed in the line spectral frequency (LSF) domain rather than in the Linear Prediction Coefficients (LPC) domain. Weighted summation in the line spectral frequency (LSF) domain may be guaranteed to result in stable inverse filters which are not always the case in Linear Prediction Coefficients (LPC) domain.

In some embodiments the hearing device is a first hearing device configured to communicate with a second hearing device in a binaural hearing device system configured to be worn by a user. Thus the user may wear two hearing devices, a first hearing device for example in or at the left ear, and a second hearing device for example in or at the right ear. The two hearing devices may communicate with each other for providing the best possible sound output to the user. The two hearing devices may be hearing aids configured to be worn by a user who needs hearing compensation in both ears.

In some embodiments the first hearing device comprises a first input transducer for providing a left ear input signal comprising a left ear speech signal and a left ear noise signal. In some embodiments the second hearing device comprises a second input transducer for providing a right ear input signal comprising a right ear speech signal and a right ear noise signal. In some embodiments the first hearing device comprises a first processing unit configured for determining one or more left parameters of the left ear input signal based on the codebook based approach processing. In some embodiments the second hearing device comprises a second processing unit configured for determining one or more right parameters of the right ear input signal based on the codebook based approach processing. Thus the first hearing device and first processing unit may determine the left parameters for the left ear input signal. The second hearing device and second processing unit may determine the right parameters for the right ear input signal. Thus a set of parameters may be determined for each ear. Alternatively one of the first or second hearing devices is selected as the main or master hearing device, and this main or master hearing device may perform the processing of the input signal for both hearing device and thus for both ears input signals, whereby the processing unit of the main or master hearing device may determine the parameters for both the left ear input signal and for the right ear input signal.

The present disclosure relates to different aspects including the hearing device and method described above and in the following, and corresponding methods, hearing devices, systems, networks, kits, uses and/or product means, each yielding one or more of the benefits and advantages described in connection with the first mentioned aspect(s), and each having one or more embodiments corresponding to the embodiments described in connection with the first mentioned aspect(s) and/or disclosed in the appended claims.

A hearing device for enhancing speech intelligibility, the hearing device includes: an input transducer for providing an input signal comprising a speech signal and a noise signal; a processing unit; an acoustic output transducer coupled to the processing unit, the acoustic output transducer configured to provide an audio output signal based on an output signal form the processing unit; wherein the processing unit is configured to determine one or more parameters of the input signal based on a codebook based approach (CBA) processing; and wherein the processing unit is configured to perform a Kalman filtering of the input signal based on the determined one or more parameters so that the output signal has an enhanced speech intelligibility.

Optionally, the input signal is divided into one or more frames, the one or more frames comprising primary frames representing speech signals, secondary frames representing noise signals, tertiary frames representing silence, or any combination of the foregoing.

Optionally, the one or more parameters comprise short term predictor (STP) parameters.

Optionally, the one or more parameters comprise one or a combination of: a first parameter being a state evolution matrix C(n) comprising of speech Linear Prediction Coefficients (LPC) and noise Linear Prediction Coefficients (LPC), a second parameter being a variance of a speech excitation signal $\sigma_u^2$ (n), and a third parameter being a variance of a noise excitation signal $\sigma_v^2$ (n).

Optionally, the one or more parameters are assumed to be constant over frames of 25 milliseconds.

Optionally, the processing unit is configured to determine the one or more parameters based on a priori information about speech spectral shapes and/or noise spectral shapes stored in a codebook in a form of Linear Prediction Coefficients (LPC).

Optionally, the codebook based approach (CBA) processing involves a generic speech codebook or a speaker specific trained codebook.

Optionally, the code book based approach (CBA) processing involves a speaker specific trained codebook, and wherein the speaker specific trained codebook comprises data based on recording speech of multiple persons.

Optionally, the processing unit is configured to automatically select a codebook for the codebook based approach (CBA) processing from a plurality of available codebooks, and wherein the processing unit is configured to automatically select the codebook based on a spectra of the input signal and/or based on a measurement of short term objective intelligibility (STOI) for each of the available codebooks.

Optionally, the processing unit is configured to perform the Kalman filtering using a fixed lag Kalman smoother that is configured to provide a minimum mean-square estimator (MMSE) of the speech signal.

Optionally, the processing unit is configured to perform the Kalman filtering of the input signal by computing an a priori estimate and an a posteriori estimate of a state vector, and an error covariance matrix of the input signal.

Optionally, the processing unit is configured to perform a weighted summation of short term predictor (STP) parameters of the speech signal in a line spectral frequency (LSF) domain.

Optionally, the hearing device is a first hearing device configured to communicate with a second hearing device in a binaural hearing device system configured to be worn by a user.

Optionally, the input transducer comprises a first input transducer, the input signal comprises a left ear input signal, and wherein the first hearing device comprises the first input transducer for providing the left ear input signal; wherein the second hearing device comprises a second input transducer for providing a right ear input signal comprising a right ear speech signal and a right ear noise signal; wherein the processing unit comprises a first processing unit, the one or more parameters of the input signal comprises one or more left parameters of the left ear input signal, and wherein the first hearing device comprises the first processing unit configured for determining the one or more left parameters of the left ear input signal based on the codebook based approach (CBA) processing; and wherein the second hearing device comprises a second processing unit configured for determining one or more right parameters of the right ear input signal.

A method for enhancing speech intelligibility in a hearing device, the method includes: providing an input signal comprising a speech signal and a noise signal; determining, using a processing unit, one or more parameters of the input signal based on a codebook based approach (CBA) processing; performing, using the processing unit, a Kalman filtering of the input signal based on the determined one or more parameters to generate an output signal that has an enhanced speech intelligibility; and providing an audio output signal by an acoustic output transducer based on the output signal.

Other features and advantageous will be described in the detailed description.

BRIEF DESCRIPTION OF THE DRAWINGS

The above and other features and advantages will become readily apparent to those skilled in the art by the following detailed description of exemplary embodiments thereof with reference to the attached drawings, in which.

DETAILED DESCRIPTION

Figure 1A:
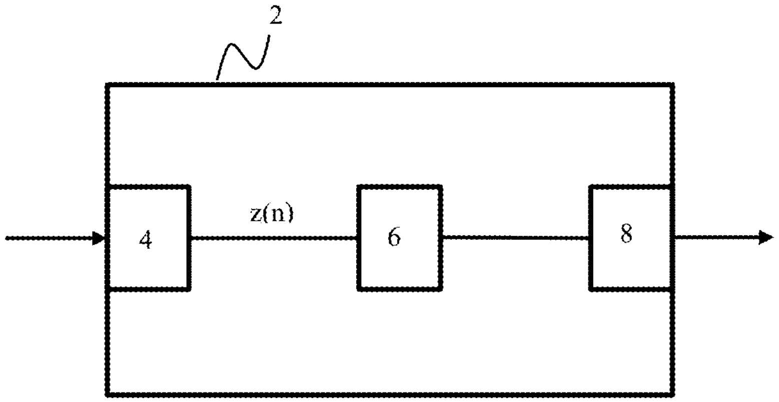
FIG. 1*a*) schematically illustrates a hearing device for enhancing speech intelligibility.

Various embodiments are described hereinafter with reference to the figures. Like reference numerals refer to like elements throughout. Like elements will, thus, not be described in detail with respect to the description of each figure. It should also be noted that the figures are only intended to facilitate the description of the embodiments. They are not intended as an exhaustive description of the claimed invention or as a limitation on the scope of the claimed invention. In addition, an illustrated embodiment needs not have all the aspects or advantages shown. An aspect or an advantage described in conjunction with a particular embodiment is not necessarily limited to that embodiment and can be practiced in any other embodiments even if not so illustrated, or if not so explicitly described.

Throughout, the same reference numerals are used for identical or corresponding parts.

FIG. 1*a* schematically illustrates a hearing device 2 for enhancing speech intelligibility.

The hearing device 2 comprises an input transducer 4, such as a microphone, for providing an input signal z(n) or noisy signal z(n) comprising a speech signal (s(n) and a noise signal w(n).

The hearing device 2 comprises a processing unit 6 configured for processing the input signal z(n).

The hearing device 2 comprises an acoustic output transducer 8, such as a receiver or loudspeaker, coupled to an output of the processing unit 6 for conversion of an output signal form the processing unit 6 into an audio output signal.

The processing unit 6 is configured for performing a codebook based approach processing on the input signal z(n).

The processing unit 6 is configured for determining one or more parameters of the input signal z(n) based on the codebook based approach processing.

The processing unit 6 is configured for performing a Kalman filtering of the input signal z(n) using the determined one or more parameters.

The processing unit 6 is configured to provide that the output signal is speech intelligibility enhanced due to the Kalman filtering.

The present hearing device and method relate to a speech enhancement framework based on Kalman filter. The Kalman filtering for speech enhancement may be for white background noise, or for coloured noise where the speech and noise short term predictor (STP) parameters required for the functioning of the Kalman filter is estimated using an approximated estimate-maximize algorithm. The present hearing device and method uses a codebook-based approach for estimating the speech and noise short term predictor (STP) parameters. Objective measures such as short term objective intelligibility (STOI) and Segmental SNR (SegSNR) have been used in the present hearing device and method to evaluate the performance of the enhancement algorithm in presence of babble noise. The effects of having a speaker specific trained codebook over a generic speech codebook on the performance of the algorithm have been investigated for the present hearing device and method. In the following, the signal model and the assumptions that are used will be explained. The speech enhancement framework will be explained in detail. Experiments and results will also be presented.

The signal model and assumptions that will be used is now presented. It is assumed that a speech signal s(n) also called a clean speech signal s(n) is additively interfered with a noise signal w(n) to form the input signal z(n) also called the noisy signal z(n) according to the equation:

$$z(n)=s(n)+\omega(n)\forall n=1,2 \tag{1}$$

It may also be assumed that the noise and speech are statistically independent or uncorrelated with each other. The clean speech signal s(n) may be modelled as a stochastic autoregressive (AR) process represented by the equation:

$$s(n)=\sum_{i=1}^{P} a_i s(n-i)+u(n)=a^T s(n-1)+u(n), \tag{2}$$

where $$a(n)=[a_1(n), a_2(n), \ldots a_P(n)]^T$$

is a vector containing the speech Linear Prediction Coefficients (LPC), $s(n-1)=[s(n-1), \ldots s(n-p)]^T$, P is the order of the autoregressive (AR) process corresponding to the speech signal and u(n) is a white Gaussian noise (WGN) with zero mean and excitation variance $\sigma^2_u(n)$.

The noise signal may also be modelled as an autoregressive (AR) process according to the equation $$w(n)=\sum_{i=1}^{Q} b_i(n)w(n-i)+v(n)=b(n)^T w(n-1)+v(n), \tag{3}$$

where $$b(n)=[b_1(n), b_2(n), \ldots b_Q(n)]^T$$

is a vector containing noise Linear Prediction Coefficients (LPC), $w(n-1)=[w(n-1), \ldots w(n-Q)]^T$, Q is the order of the autoregressive (AR) process corresponding to the noise signal and v(n) is a white Gaussian noise (WGN) with zero mean and excitation variance $\sigma^2_v(n)$. Linear Prediction Coefficients (LPC) along with excitation variance generally constitutes the short term predictor (STP) parameters.

Figure 1B:
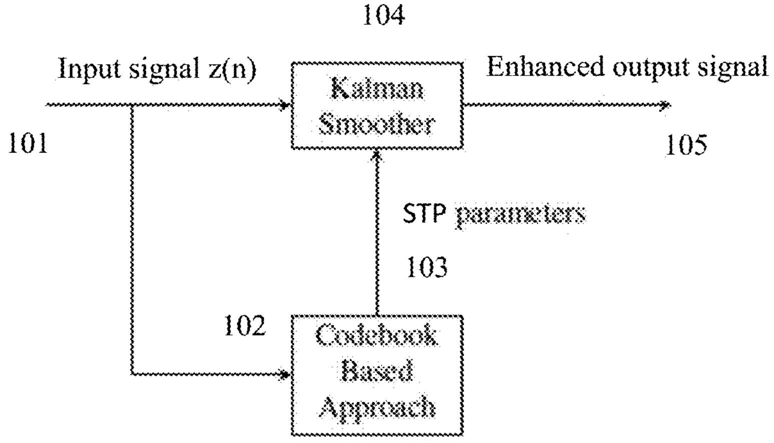
FIG. 1*b*) schematically illustrates a method for enhancing speech intelligibility in a hearing device.

In the present hearing device and method a single channel speech enhancement technique based on Kalman filtering may be used. A basic block diagram of the speech enhancement framework is shown in FIG. 1*b*). It can be seen from the figure that the input signal z(n) also called noisy signal is fed as an input to a Kalman smoother of the Kalman filtering, and the speech and noise short term predictor (STP) parameters used for the functioning of the Kalman smoother is estimated using a codebook based approach. Principles of the Kalman filter based speech enhancement are explained just below, and the codebook based estimation of the speech and noise short term predictor (STP) parameters is explained later.

FIG. 1*b*) schematically illustrates a method for enhancing speech intelligibility in a hearing device.

In step 101 the method comprises providing an input signal z(n) comprising a speech signal and a noise signal.

In step 102 the method comprises performing a codebook based approach processing on the input signal z(n).

In step 103 the method comprises determining one or more parameters of the input signal z(n) based on the codebook based approach processing in step 102. The parameters may be short term predictor (STP) parameters.

In step 104 the method comprises performing a Kalman filtering of the input signal z(n) using the determined one or more parameters from step 103.

In step 105 the method comprises providing that an output signal is speech intelligibility enhanced due to the Kalman filtering in step 104.

Kalman Filter for Speech Enhancement:

The Kalman filter enables us to estimate the state of a process governed by a linear stochastic difference equation in a recursive manner. It may be an optimal linear estimator in the sense that it minimises the mean of the squared error. This section explains the principle of a fixed lag Kalman smoother with a smoother delay d≥P. The Kalman smoother may provide the minimum mean square error (MMSE) estimate of the speech signal s(n) which can be expressed as $$\tilde{s}(n)=E(s(n)|z(n+d), \ldots, z(1))\ \forall n=1,2 \tag{4}$$

The usage of Kalman filter from a speech enhancement perspective may require the autoregressive (AR) signal model in eq. (2) to be written as a state space as shown below $$s(n)=A(n)s(n-1)+\Gamma_1 u(n), \tag{5}$$

where the state vector $s(n)=[s(n)s(n-1) \ldots s(n-d)]^T$ is a (d+1)x1 vector containing the d+1 recent speech samples, $\Gamma_1=[1, 0 \ldots 0]^T$ is a (d+1)x1 vector and A(n) is the (d+1)x(d+1) speech state evolution matrix as shown below $$A(n)=\begin{bmatrix} a_1(n) & a_2(n) & \ldots & a_P(n) & 0 & \ldots & 0 \\ 1 & 0 & \ldots & 0 & 0 & \ldots & 0 \\ \vdots & \ddots & \ddots & \vdots & \vdots & \ldots & \vdots \\ 0 & \ldots & 1 & 0 & \vdots & \ldots & 0 \\ 0 & \ldots & \ldots & 1 & 0 & \ldots & 0 \\ \vdots & \ldots & \ldots & 0 & \ddots & \ddots & \vdots \\ 0 & \ldots & \ldots & 0 & 0 & 1 & 0 \end{bmatrix}. \tag{6}$$

Analogously, the autoregressive (AR) model for the noise signal w(n) shown in (3) can be written in the state space form as $$w(n)=B(n)w(n-1)+\Gamma_2 v(n), \tag{7}$$

where the state vector $w(n)=[w(n)w(n-1) \ldots w(n-Q+_1)]^T$ is a Q×1 vector containing the Q recent noise samples, $\Gamma_2=[1, 0 \ldots 0]^T$ is a Q×1 vector and B(n) is the Q×Q noise state evolution matrix as shown below $$B(n)=\begin{bmatrix} b_1(n) & b_2(n) & \ldots & b_Q(n) \\ 1 & 0 & \ldots & 0 \\ \vdots & \ddots & \ddots & \vdots \\ 0 & \ldots & 1 & 0 \end{bmatrix}. \tag{8}$$

The state space equations in eq. (5) and eq. (7) may be combined together to form a concatenated state space equation as shown in (9)

$$\begin{bmatrix} s(n) \\ w(n) \end{bmatrix} = \begin{bmatrix} A(n) & 0 \\ 0 & B(n) \end{bmatrix}\begin{bmatrix} s(n-1) \\ w(n-1) \end{bmatrix} + \begin{bmatrix} r_1 & 0 \\ 0 & r_2 \end{bmatrix}\begin{bmatrix} u(n) \\ v(n) \end{bmatrix} \tag{9}$$

which may be rewritten as $$x(n)=C(n)x(n-1)+\Gamma_3 y(n), \tag{10}$$

where x(n) is the concatenated state space vector, C(n) is the concatenated state evolution matrix, $$\Gamma_3 = \begin{bmatrix} \Gamma_1 & 0 \\ 0 & \Gamma_2 \end{bmatrix}$$

and $$y(n) = \begin{bmatrix} u(n) \\ v(n) \end{bmatrix}$$

Consequently, eq. (1) can be rewritten as $$z(n)=\Gamma^T x(n), \tag{11}$$

where $$\Gamma=[\Gamma_1^T \Gamma_2^T]^T$$

The final state space equation and measurement equation denoted by eq. (10) and eq. (11) respectively, may subsequently be used for the formulation of the Kalman filter equations (eq. 12-eq. 17), see below. The prediction stage of the Kalman smoother denoted by equations eq. (12) and eq. (13) may compute the a priori estimates of the state vector $$\hat{x}(n|n-1)$$

and error covariance matrix $$M(n|n-1)$$

respectively $$\hat{x}(n \mid n-1) = C(n)\hat{x}(n-1 \mid n-1) \tag{12}$$

$$M(n \mid n-1) = C(n)M(n-1 \mid n-1)C(n)^T + \Gamma_3\begin{bmatrix} \sigma_u^2(n) & 0 \\ 0 & \sigma_v^2(n) \end{bmatrix}\Gamma_3^T. \tag{13}$$

The Kalman gain may be computed as shown in eq. (14)

$$K(n)=M(n|n-1)\Gamma[\Gamma^T M(n|n-1)\Gamma]^{-1}. \quad (14)$$

The correction stage of the Kalman smoother which computes the a posteriori estimates of the state vector and error covariance matrix may be written as $$\hat{x}(n|n)=\hat{x}(n|n-1)+K(n)[z(n)-\Gamma^T\hat{x}(n|n-1)] \quad (15)$$

$$M(n|n)=(I-K(n)\Gamma^T)M(n|n-1). \quad (16)$$

Finally, the enhanced output signal s^ using a Kalman smoother at time index n−d may be obtained by taking the d+1$^{th}$ entry of the a posteriori estimate of the state vector as shown in eq. (17)

$$\hat{s}(n-d)=\hat{x}_{d+1}(n|n). \quad (17)$$

In case of a Kalman filter, d+1=P and the enhanced signal s^ at time index n may be obtained by taking the first entry of the a posteriori estimate of the state vector as shown below $$\hat{s}(n)=\hat{x}_1(n|n).$$

Codebook Based Estimation of Autoregressive STP Parameters:

The usage of a Kalman filter from a speech enhancement perspective as explained above may require the state evolution matrix C(n), consisting of the speech Linear Prediction Coefficients (LPC) and noise Linear Prediction Coefficients (LPC), variance of speech excitation signal $\sigma^2_u(n)$ and variance of the noise excitation signal $\sigma^2_v(n)$ to be known. These parameters may be assumed to be constant over frames of 20-25 milliseconds (ms) due to the quasi-stationary nature of speech. This section explains the minimum mean square error (MMSE) estimation of these parameters using a codebook based approach. This method may use the a priori information about speech and noise spectral shapes stored in trained codebooks in the form of Linear Prediction Coefficients (LPC). The parameters to be estimated may be concatenated to form a single vector $$\theta=[a;b;\sigma_u^2;\sigma_v^2].$$

The minimum mean square error (MMSE) estimate of the parameter e may be written as $$\hat{\theta}=E(\theta|z), \quad (18)$$

where z denotes a frame of noisy samples. Using the Bayes theorem, eq. (19) can be rewritten as $$\hat{\theta} = \int_{\Theta}\theta p(\theta \mid z)d\theta = \int_{\Theta}\theta\frac{p(z \mid \theta)p(\theta)}{p(z)}d\theta, \quad (19)$$

where θ denotes the support space of the parameters to be estimated. Let us define $$\theta_{i,j}=[a_i;b_j;\sigma_{u,ij}^{2,ML};\sigma_{v,ij}^{2,ML}]$$

where $a_i$ is the i$^{th}$ entry of speech codebook (of size $N_s$), $b_j$ is the j$^{th}$ entry of the noise codebook (of size $N_w$) and $$\sigma_{u,ij}^{2,ML},\sigma_{v,ij}^{2,ML}$$

represents the maximum likelihood (ML) estimates of speech and noise excitation variances which depends on $a_i$, $b_j$ and z. Maximum likelihood (ML) estimates of speech and noise excitation variances may be estimated according to the following equation, $$E\begin{bmatrix}\sigma_{u,ij}^{2,ML}\\ \sigma_{v,ij}^{2,ML}\end{bmatrix} = D, \quad (20)$$

where $$E = \begin{bmatrix} \left\|\frac{1}{P_z^2(\omega)|A_s^i(\omega)|^4}\right\| & \left\|\frac{1}{P_z^2(\omega)|A_s^i(\omega)|^2|A_w^j(\omega)|^2}\right\| \\ \left\|\frac{1}{P_z^2(\omega)|A_s^i(\omega)|^2|A_w^j(\omega)|^2}\right\| & \left\|\frac{1}{P_z^2(\omega)|A_w^j(\omega)|^4}\right\| \end{bmatrix}, \quad (21)$$

$$D = \begin{bmatrix} \left\|\frac{1}{P_z(\omega)|A_s^i(\omega)|^2}\right\| \\ \left\|\frac{1}{P_z(\omega)|A_w^j(\omega)|^2}\right\| \end{bmatrix}, \quad (22)$$

and $$\frac{1}{|A_s^i(\omega)|^2}$$

is the spectral envelope corresponding to the i$^{th}$ entry of the speech codebook, $$\frac{1}{|A_w^i(\omega)|^2}$$

is the spectral envelope corresponding to the j$^{th}$ entry of the noise codebook and $P_z(\omega)$ is the spectral envelope corresponding to the noisy signal z(n). Consequently, a discrete counterpart to eq. (20) can be written as $$\hat{\theta} = \frac{1}{N_s N_w}\sum_{i=1}^{N_s}\sum_{j=1}^{N_w}\theta_{ij}\frac{p(z \mid \theta_{ij})p(\sigma_{u,ij}^{2,ML})p(\sigma_{v,ij}^{2,ML})}{p(z)}, \quad (23)$$

where the minimum mean square error (MMSE) estimate may be expressed as a weighted linear combination of $\theta_{ij}$ with weights proportional to $$p(z|\theta_{ij})$$

which may be computed according to the following equations $$p(z \mid \theta_{ij}) = \exp\left(-d_{IS}\left(P_z(\omega), \hat{P}_z^{ij}(\omega)\right)\right) \quad (24)$$

$$\hat{P}_z^{ij}(\omega) = \frac{\sigma_{u,ij}^{2,ML}}{|A_s^i(\omega)|^2} + \frac{\sigma_{v,ij}^{2,ML}}{|A_w^i(\omega)|^2} \quad (25)$$

$$p(z) = \frac{1}{N_s N_w}\sum_{i=1}^{N_s}\sum_{j=1}^{N_w}p(z \mid \theta_{ij})p(\sigma_{u,ij}^{2,ML})p(\sigma_{v,ij}^{2,ML}) \quad (26)$$

where $$d_{IS}\left(P_z(\omega), \hat{P}_z^{ij}(\omega)\right)$$

is the Itakura Saito distortion between the noisy spectrum and the modelled noisy spectrum. It should be noted that the weighted summation of autoregressive (AR) parameters in eq. (23) preferably is to be performed in the line spectral frequency (LSF) domain rather than in the Linear Prediction Coefficients (LPC) domain. Weighted summation in the line spectral frequency (LSF) domain may be guaranteed to result in stable inverse filters which are not always the case in Linear Prediction Coefficients (LPC) domain.

Experiments:

This section describes the experiments performed to evaluate the speech enhancement framework explained above. Objective measures, that have been used for evaluation are short term objective intelligibility (STOI), Perceptual Evaluation of Speech Quality (PESQ) and Segmental signal-to-noise ratio (SegSNR). The test set for this experiment consisted of speech from four different speakers: two male and two female speakers from the CHIME database resampled to 8 KHz. The noise signal used for simulations is multi-talker babble from the NOIZEUS database. The speech and noise STP parameters required for the enhancement procedure is estimated every 25 ms as explained above. Speech codebook used for the estimation of STP parameters may be generated using the Generalised Lloyd algorithm (GLA) on a training sample of 10 minutes of speech from the TIMIT database. The noise codebook may be generated using two minutes of babble. The order of the speech and noise AR model may be chosen to be 14. The parameters that have been used for the experiments are summarised in Table 1 below.

TABLE 1

| Experimental setup | | | | | |
|---|---|---|---|---|---|
| fs | Frame Size | $N_s$ | $N_w$ | P | Q |
| 8 Khz | 160(20 ms) | 128 | 12 | 10 | 10 |

The estimated short term predictor (STP) parameters are subsequently used for enhancement by a fixed lag Kalman smoother (with d=40). The effects of having a speaker specific codebook instead of a generic speech codebook are also investigated here. The speaker specific codebook may generated by Generalised Lloyd algorithm (GLA) using a training sample of five minutes of speech from the specific speaker of interest. The speech samples used for testing were not included in the training set. A speaker codebook size of 64 entries was empirically noted to be sufficient. The system of Kalman smoother, utilising a speech codebook and speaker codebook for the estimation of short term predictor (STP) parameters is denoted as KS-speech model and KS-speaker model respectively. The results are compared with Ephraim-Malah (EM) method and state of the art minimum mean square error (MMSE) estimator based on generalised gamma priors (MMSE-GGP).

Figure 2:
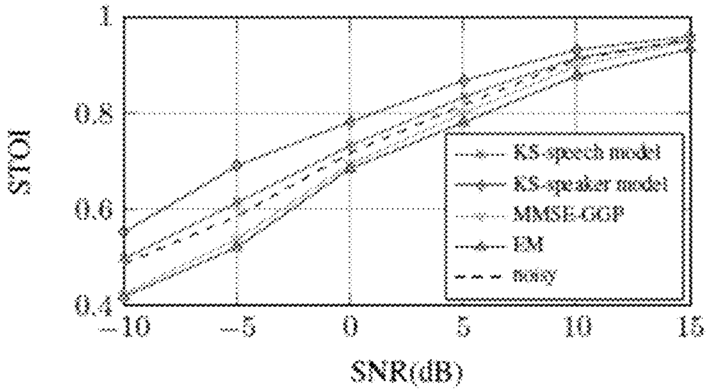
FIG. 2, FIG. 3 and FIG. 4 show the comparison of short term objective intelligibility (STOI), Segmental signal-to-noise ratio (SegSNR) and Perceptual Evaluation of Speech Quality (PESQ) scores respectively, for methods for enhancing the speech intelligibility.
Figure 3:
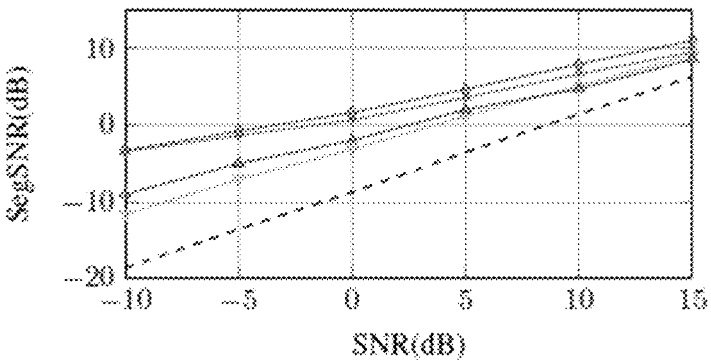
Figure 4:
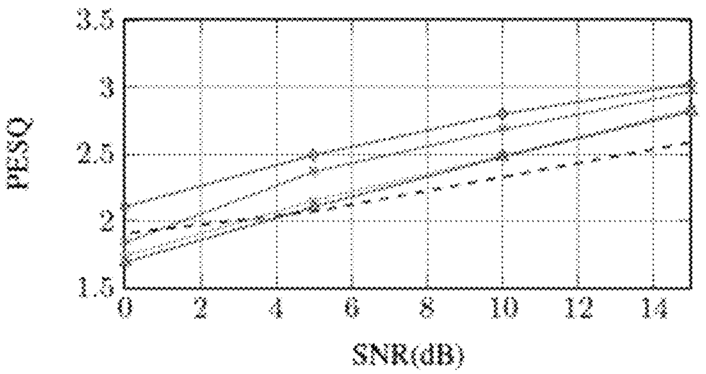

FIGS. 2, 3 and 4 shows the comparison of short term objective intelligibility (STOI), Segmental signal-to-noise ratio (SegSNR) and Perceptual Evaluation of Speech Quality (PESQ) scores respectively, for the above mentioned methods. It can be seen from FIG. 2 that the enhanced signals obtained using Ephraim-Malah (EM) and minimum mean square error (MMSE) estimator based on generalised gamma priors (MMSE-GGP) have lower intelligibility scores than the noisy signal, according to short term objective intelligibility (STOI). The enhanced signals obtained using KS-speech model and KS-speaker model show a higher intelligibility score in comparison to the noisy signal. It can be seen, that using a speaker specific codebook instead of a generic speech codebook is beneficial, as the short term objective intelligibility (STOI) scores shows an increase of up to 6%. The Segmental signal-to-noise ratio (SegSNR) and Perceptual Evaluation of Speech Quality (PESQ) results shown in FIGS. 3 and 4 also indicate that KS-speaker model and KS-speech model performs better than the other methods. Informal listening tests were also conducted to evaluate the performance of the algorithm.

Thus it is an advantage to provide a hearing device and a method of speech enhancement based on Kalman filter, and where the parameters required for the functioning of Kalman filter were estimated using a codebook based approach. Objective measures such as short term objective intelligibility (STOI), Segmental signal-to-noise ratio (SegSNR) and Perceptual Evaluation of Speech Quality (PESQ) were used to evaluate the performance of the method in presence of babble noise. Experimental results indicate that the presented method was able to increase the speech quality and speech intelligibility according to the objective measures. Moreover, it was noted that having a speaker specific trained codebook instead of a generic speech codebook can show up to 6% increase in short term objective intelligibility (STOI) scores.

Binaural Hearing System

This section regards the estimation of speech and noise short term predictor (STP) parameters using codebook based approach when we have access to binaural noisy signals, i.e. input signals. The estimated short term predictor (STP) parameters may be further used for enhancement of the binaural noisy signals. In the following first the signal model and the assumptions that will be used are introduces. Then the estimation of short term predictor (STP) parameters in a binaural scenario is explained and the experimental results are discusses.

Signal Model:

The binaural noisy signals or input signals at the left and right ears are denoted by zl(n) and zr(n) respectively. Noisy signal at the left ear zl(n) is expressed as shown in eq. (27), where sl(n) is the clean speech component and wl(n) is the noise component at the left ear.

$$z_l(n)=s_l(n)+\omega_l(n)\forall n=1,2\ \ldots$$

The noisy signal at the right ear is expressed similarly as shown in eq. (28)

$$z_r(n)=s_r(n)+\omega_r(n)\forall n=1,2\ \ldots$$

It may be further assumed that the speech signal and noise signal can be represented as autoregressive (AR) process. It may be assumed that the speech source is in front of the listener i.e. the user of the hearing device, and it may thus be assumed that the clean speech component at the left and right ears is represented by the same autoregressive (AR) process. The noise component at the left and right ears may also be assumed to be represented by the same autoregressive (AR) process. The short term predictor (STP) parameters corresponding to an autoregressive (AR) process may constitute of the linear prediction coefficients (LPC) and the variance of the excitation signal. The short term predictor (STP) parameters corresponding to speech may be represented as $$\theta_u=[a\sigma_u^2],$$

where a is the vector of linear prediction coefficients (LPC) coefficients and $$\sigma_u^2$$

is the excitation variance corresponding to the speech autoregressive (AR) process. Analogously, the short term predictor (STP) parameters corresponding to the noise autoregressive (AR) process may be represented as $$\theta_u=[b\sigma_v^2].$$

Method:

An objective here is to estimate the short term predictor (STP) parameters corresponding to the speech and noise autoregressive (AR) process given the binaural noisy signal or input signals. Let us denote the parameters to be estimated as $$\theta=[\theta_u\theta_v].$$

The minimum mean-square error (MMSE) estimate of the parameter e is written as eq. (29) and (30):

$$\hat{\theta}=E(\theta\mid z_l,z_r),$$

$$\hat{\theta}=\int_{\Theta}\theta p(\theta\mid z_l,z_r)d\theta=\int_{\Theta}\theta\frac{p(z_l,z_r\mid\theta)p(\theta)}{p(z_l,z_r)}d\theta,$$

Let us define $$\theta_{ij}=[a_i;\sigma_{u,ij}^{2,ML};b_j;\sigma_{v,ij}^{2,ML}]$$

where ai is the l'th entry of speech codebook (of size Ns), bj is the j'th entry of the noise codebook (of size Nw) and $$\sigma_{u,ij}^{2,ML},\sigma_{v,ij}^{2,ML}$$

represents the maximum likelihood (ML) estimates of the excitation variances. The discrete counterpart of (30) is written as eq (31):

$$\hat{\theta}=\frac{1}{N_sN_w}\sum_{i=1}^{N_s}\sum_{j=1}^{N_w}\theta_{ij}\frac{p(z_l,z_r\mid\theta_{ij})p(\sigma_{u,ij}^{2,ML})p(\sigma_{v,ij}^{2,ML})}{p(z_l,z_r)},$$

Weight of the i,j'th codebook combination is determined by $$p(z_l,z_r|\theta_{ij}).$$

Assuming that modeling errors for the left and right noisy signal or input signal is conditionally independent, $$p(z_l,z_r|\theta_{ij}).$$

can be written as eq (32):

$$p(z_l,z_r|\theta_{ij})=p(z_l|\theta_{ij})p(z_r|\theta_{ij})$$

Logarithm of the likelihood $$p(z_l|\theta_{ij})$$

can be written as the negative of Itakura Saito distortion between noisy spectrum at the left ear $$P_u(\omega)$$

and modelled noisy spectrum $$\hat{P}_z^{ij}(\omega)$$

Using the same result for the right ear $$p(z_l,z_r|\theta_{ij})$$

can be written as eq (33) and (34):

$$p(z_l,z_r|\theta_{ij})=\exp(-d_{18}(P_{z_l}(\omega),\hat{P}_z^{ij}(\omega)))\exp(-d_{18}(P_{z_r}(\omega),\hat{P}_z^{ij}(\omega)))$$

$$p(z_l,z_r|\theta_{ij})=\exp(-(d_{18}(P_{z_l}(\omega),\hat{P}_z^{ij}(\omega))+d_{18}(P_{z_r}(\omega),\hat{P}_z^{ij}(\omega))))$$

The estimates of short term predictor (STP) parameters may then be obtained by substituting eq. (34) in eq. (31). A block diagram of the proposed method is shown in FIG. 5.

Figure 5:
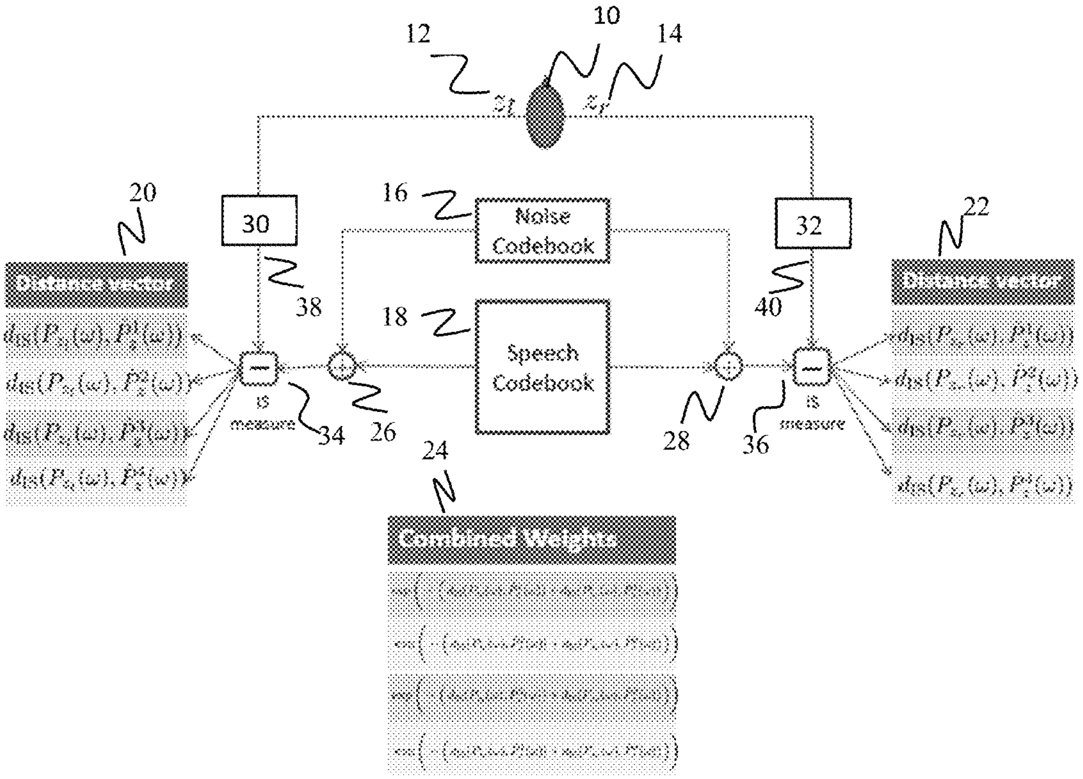
FIG. 5 schematically illustrates a block diagram for estimation of short term predictor (STP) parameters from binaural input signals.

FIG. 5 schematically illustrates a block diagram for estimation of short term predictor (STP) parameters from binaural input signals or noisy signals. FIG. 5 shows the hearing device user 10, the left ear input signal zl(n) 12 or noisy signal at the left ear 12 and the right ear input signal zr(n) 14 or noisy signal at the right ear 14, the noise codebook 16 and the speech codebook 18, the distance vector 20 for the left ear and the distance vector 22 for the right ear, and the combined weights 24. The spectral envelope 30 is for the left ear input signal zl(n) 12 to form the noisy spectrum 38 at the left ear. The spectral envelope 32 is for the right ear input signal zr(n) 14 to form the noisy spectrum 40 at the right ear. The noise codebook 16 represents the modeled noise spectrum. The speech codebook 18 represents the modeled speech spectrum. The noise codebook 16 and the speech codebook 18 are added together (sum) to form the modeled noisy spectrum 26 for the left ear and the modeled noisy spectrum 28 for the right ear. The modeled noisy spectra 26 and 28 may be the same. The Itakura Saito distortion or IS measure 34 for the left ear and 36 for the right ear is computed between the modeled noisy spectrum 26 (left ear), 28 (right ear) and the actual noisy spectrum 38 (left ear), 40 (right ear) for all the codebook combinations, which gives the distance vectors 20 for the left ear and 22 for the right ear. These weights are then combined to form the combined weights 24 of the left and right ear.

Figure 6A:
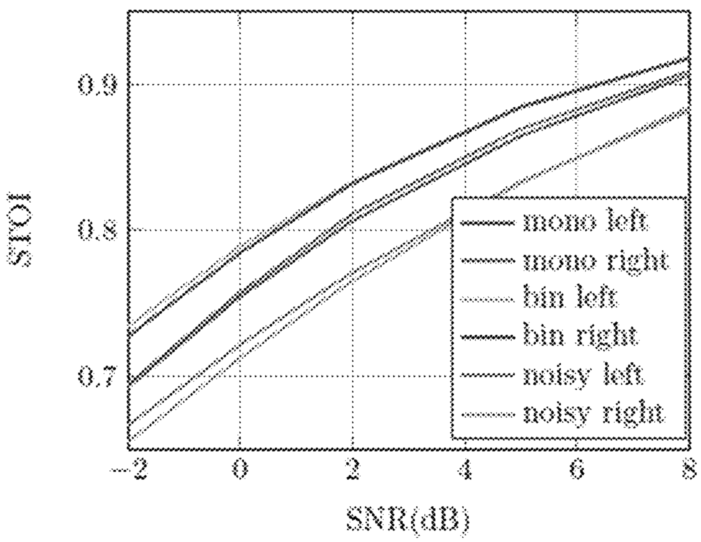
FIGS. 6*a*) and 6*b*) show the comparison of the short term objective intelligibility (STOI) and Perceptual Evaluation of Speech Quality (PESQ) results respectively, for binaural signals.
Figure 6B:
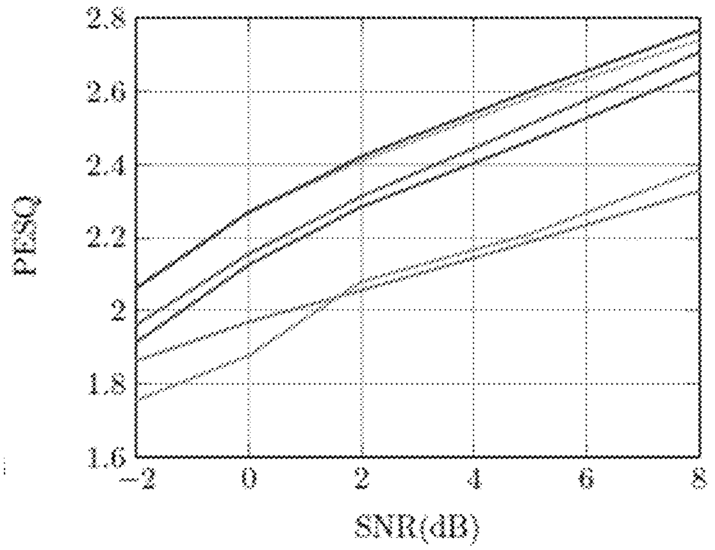

Thus the estimation of the short term predictor (STP) parameters in a binaural scenario is performed by calculating the Itakura Saito distances between the modeled noisy spectrum and received noisy spectrum, for each ear. These distances are then combined to obtain the weights for a particular codebook combination Experimental Results:

This section explains the short term objective intelligibility (STOI) and Perceptual Evaluation of Speech Quality (PESQ) results obtained. Estimated short term predictor (STP) parameters may be used for enhancement on binaural noisy signals. Noisy signals are generated by first convolving the clean speech with impulse responses generated and subsequently summing up with binaural babble noise. FIGS. 6*a* and 6*b* show the comparison of the short term objective intelligibility (STOI) and Perceptual Evaluation of Speech Quality (PESQ) results respectively. It can be seen that binaural estimation of short term predictor (STP) parameters shows upto 2.5% increase in the short term objective intelligibility (STOI) scores and 0.08 increase in Perceptual Evaluation of Speech Quality (PESQ) scores. Thus the output signal is further speech intelligibility enhanced in a binaural hearing system.

Kalman Filtering

Kalman filtering, also known as linear quadratic estimation (LQE), is an algorithm that uses a series of measurements observed over time, containing statistical noise and other inaccuracies, and produces estimates of unknown variables that tend to be more precise than those based on a single measurement alone.

The Kalman filter may be applied in time series analysis used in fields such as signal processing.

The Kalman filter algorithm works in a two-step process. In the prediction step, the Kalman filter produces estimates of the current state variables, along with their uncertainties. Once the outcome of the next measurement (necessarily corrupted with some amount of error, including random noise) is observed, these estimates are updated using a weighted average, with more weight being given to estimates with higher certainty. The algorithm is recursive. It can run in real time, using only the present input measurements and the previously calculated state and its uncertainty matrix; no additional past information is required.

The Kalman filter may not require any assumption that the errors are Gaussian. However, the Kalman filter may yield the exact conditional probability estimate in the special case that all errors are Gaussian-distributed.

Extensions and generalizations to the Kalman filtering method may be provided, such as the extended Kalman filter and the unscented Kalman filter which work on nonlinear systems. The underlying model may be a Bayesian model similar to a hidden Markov model but where the state space of the latent variables is continuous and where all latent and observed variables may have Gaussian distributions.

The Kalman filter uses a system's dynamics model, known control inputs to that system, and multiple sequential measurements to form an estimate of the system's varying quantities (its state) that is better than the estimate obtained by using any one measurement alone.

In general all measurements and calculations based on models are estimated to some degree. Noisy data, and/or approximations in the equations that describe how a system changes, and/or external factors that are not accounted for introduce some uncertainty about the inferred values for a system's state. The Kalman filter may average a prediction of a system's state with a new measurement using a weighted average. The purpose of the weights is that values with better (i.e., smaller) estimated uncertainty are "trusted" more. The weights may be calculated from the covariance, a measure of the estimated uncertainty of the prediction of the system's state. The result of the weighted average may be a new state estimate that may lie between the predicted and measured state, and may have a better estimated uncertainty than either alone. This process may be repeated every time step, with the new estimate and its covariance informing the prediction used in the following iteration. This means that the Kalman filter may work recursively and may require only the last "best guess", rather than the entire history, of a system's state to calculate a new state.

Because the certainty of the measurements may be difficult to measure precisely, the filter's behavior may be determined in terms of gain. The Kalman gain may be a function of the relative certainty of the measurements and current state estimate, and can be "tuned" to achieve particular performance. With a high gain, the filter may place more weight on the measurements, and thus may follow them more closely. With a low gain, the filter may follow the model predictions more closely, smoothing out noise but may decrease the responsiveness. At the extremes, a gain of one may cause the filter to ignore the state estimate entirely, while a gain of zero may cause the measurements to be ignored.

When performing the actual calculations for the filter, the state estimate and covariances may be coded into matrices to handle the multiple dimensions involved in a single set of calculations. This allows for a representation of linear relationships between different state variables in any of the transition models or covariances.

The Kalman filters may be based on linear dynamic systems discretized in the time domain. They may be modelled on a Markov chain built on linear operators perturbed by errors that may include Gaussian noise. The state of the system may be represented as a vector of real numbers. At each discrete time increment, a linear operator may be applied to the state to generate the new state, with some noise mixed in, and optionally some information from the controls on the system if they are known. Then, another linear operator mixed with more noise may generate the observed outputs from the true ("hidden") state.

In order to use the Kalman filter to estimate the internal state of a process given only a sequence of noisy observations, one may model the process in accordance with the framework of the Kalman filter. This means specifying the following matrices: $F_k$, the state-transition model; $H_k$, the observation model; $Q_k$, the covariance of the process noise; $R_k$, the covariance of the observation noise; and sometimes $B_k$, the control-input model, for each time-step, k, as described below.

The Kalman filter model may assume the true state at time k is evolved from the state at (k−1) according to $$x_k=F_k x_{k-1}+B_k u_k+w_k$$

where $F_k$ is the state transition model which is applied to the previous state $x_{k-1}$;

$B_k$ is the control-input model which is applied to the control vector $u_k$;

$w_k$ is the process noise which is assumed to be drawn from a zero mean multivariate normal distribution with covariance $Q_k$.

$$w_k \sim \mathcal{N}(0,Q_k)$$

At time k an observation (or measurement) $z_k$ of the true state $x_k$ is made according to $$z_k=H_k x_k+v_k$$

where $H_k$ is the observation model which maps the true state space into the observed space and $v_k$ is the observation noise which is assumed to be zero mean Gaussian white noise with covariance $R_k$.

$$v_k \sim \mathcal{N}(0,R_k)$$

The initial state, and the noise vectors at each step $\{x_0, w_1, \ldots, w_k, v_1 \ldots v_k\}$ may all assumed to be mutually independent.

The Kalman filter may be a recursive estimator. This means that only the estimated state from the previous time step and the current measurement may be needed to compute the estimate for the current state. In contrast to batch estimation techniques, no history of observations and/or estimates may be required. In what follows, the notation $\hat{x}_{n|m}$ represents the estimate of x at time n given observations up to, and including at time m≤n.

The state of the filter is represented by two variables:

$\hat{x}_{k/k}$, the a posteriori state estimate at time k given observations up to and including at time k;

$P_{k|k}$, the a posteriori error covariance matrix (a measure of the estimated accuracy of the state estimate).

The Kalman filter can be written as a single equation, however it may be conceptualized as two distinct phases: "Predict" and "Update". The predict phase may use the state estimate from the previous timestep to produce an estimate of the state at the current timestep. This predicted state estimate is also known as the a priori state estimate because, although it is an estimate of the state at the current timestep, it may not include observation information from the current timestep. In the update phase, the current a priori prediction may be combined with current observation information to refine the state estimate. This improved estimate is termed the a posteriori state estimate.

Typically, the two phases alternate, with the prediction advancing the state until the next scheduled observation, and the update incorporating the observation. However, this may not be necessary; if an observation is unavailable for some reason, the update may be skipped and multiple prediction steps may be performed. Likewise, if multiple independent observations are available at the same time, multiple update steps may be performed (typically with different observation matrices $H_k$).

Predict:

| | |
|---|---|
| Predicted (a priori) state estimate | $\hat{x}_{k\|k-1} = F_k\hat{x}_{k-1\|k-1} + B_k u_k$ |
| Predicted (a priori) estimate covariance | $P_{k\|k-1} = F_k P_{k-1\|k-1} F_k^T + Q_k$ |

Update:

| | |
|---|---|
| Innovation or measurement residual | $\tilde{y}_k = z_k - H_k\hat{x}_{k\|k-1}$ |
| Innovation (or residual) covariance | $S_k = H_k P_{k\|k-1} H_k^T + R_k$ |
| Optimal Kalman gain | $K_k = P_{k\|k-1} H_k^T S_k^{-1}$ |
| Updated (a posteriori) state estimate | $\hat{x}_{k\|k} = \hat{x}_{k\|k-1} + K_k\tilde{y}_k$ |
| Updated (a posteriori) estimate covariance | $P_{k\|k} = (I - K_k H_k) P_{k\|k-1}$ |

The formula for the updated estimate covariance above may only be valid for the optimal Kalman gain. Usage of other gain values may require a more complex formula.

Invariants:

If the model is accurate, and the values for $\hat{x}_{0|0}$ and $P_{0|0}$ accurately reflect the distribution of the initial state values, then the following invariants may be preserved (all estimates have a mean error of zero):

$$E[x_k - \hat{x}_{k|k}] = E[x_k - \hat{x}_{k|k-1}] = 0$$

$$E[\tilde{y}_k] = 0$$

where $E[\xi]$ is the expected value of $\xi$, and covariance matrices may accurately reflect the covariance of estimates:

$$P_{k|k} = \mathrm{cov}(x_k - \hat{x}_{k|k})$$

$$P_{k|k-1} = \mathrm{cov}(x_k - \hat{x}_{k|k-1})$$

$$s_k = \mathrm{cov}(\tilde{y}_k)$$

Optimality and Performance:

It follows from theory that the Kalman filter is optimal in cases where a) the model perfectly matches the real system, b) the entering noise is white and c) the covariances of the noise are exactly known. After the covariances are estimated, it may be useful to evaluate the performance of the filter, i.e. whether it is possible to improve the state estimation quality. If the Kalman filter works optimally, the innovation sequence (the output prediction error) may be a white noise, therefore the whiteness property of the innovations may measure filter performance. Different methods can be used for this purpose.

Deriving the a posteriori estimate covariance matrix: Starting with the invariant on the error covariance $P_{k|k}$ as above $$P_{k|k} = \mathrm{cov}(x_k - \hat{x}_{k|k})$$

substitute in the definition of $\hat{x}_{k|k}$, $$P_{k|k} = \mathrm{cov}(x_k - (\hat{x}_{k|k-1} + K_k\tilde{y}_k))$$

and substitute $\tilde{y}_k$ $$P_{k|k} = \mathrm{cov}(x_k - (\hat{x}_{k|k-1} + K_k(z_k - H_k\hat{x}_{k|k-1})))$$

and $x_k$ $$P_{k|k} = \mathrm{cov}(x_k - (\hat{x}_{k|k-1} + K_k(H_k x_k + v_k - H_k\hat{x}_{k|k-1})))$$

and collecting the error vectors:

$$P_{k|k} = \mathrm{cov}((I - K_k H_k)(x_k - \hat{x}_{k|k-1}) - K_k v_k)$$

Since the measurement error $v_k$ is uncorrelated with the other terms, this becomes $$P_{k|k} = \mathrm{cov}((I - K_k H_k)(x_k - \hat{x}_{k|k-1})) + \mathrm{cov}(K_k v_k)$$

by the properties of vector covariance this becomes $$P_{k|k} = (I - K_k H_k)\mathrm{cov}(x_k - \hat{x}_{k|k-1})(I - K_k H_k)^T + K_k\,\mathrm{cov}(v_k)K_k^T$$

which, using the invariant on $P_{k|k-1}$ and the definition of $R_k$ becomes $$P_{k|k} = (I - K_k H_k)P_{k|k-1}(I - K_k H_k)^T + K_k R_k K_k^T$$

This formula may be valid for any value of $K_k$. It turns out that if $K_k$ is the optimal Kalman gain, this can be simplified further as shown below.

Kalman Gain Derivation:

The Kalman filter may be a minimum mean-square error (MMSE) estimator. The error in the a posteriori state estimation may be $$x_k - \hat{x}_{k|k}$$

When seeking to minimize the expected value of the square of the magnitude of this vector $E[\|x_k - \hat{x}_{k|k}\|^2]$. This is equivalent to minimizing the trace of the a posteriori estimate covariance matrix $P_{k|k}$. By expanding out the terms in the equation above and collecting, we get:

$$\begin{aligned} P_{k|k} &= P_{k|k-1} - K_k H_k P_{k|k-1} - P_{k|k-1} H_k^T K_k^T + K_k(H_k P_{k|k-1} H_k^T + R_k)K_k^T \\ &= P_{k|k-1} - K_k H_k P_{k|k-1} - P_{k|k-1} H_k^T K_k^T + K_k S_k K_k^T \end{aligned}$$

The trace may be minimized when its matrix derivative with respect to the gain matrix is zero. Using the gradient matrix rules and the symmetry of the matrices involved we find that $$\frac{\partial\, tr(P_{k|k})}{\partial K_k} = -2(H_k P_{k|k-1})^T + 2K_k S_k = 0.$$

Solving this for $K_k$ yields the Kalman gain:

$$K_k S_k = (H_k P_{k|k-1})^T = P_{k|k-1} H_k^T$$

$$K_k = P_{k|k-1} H_k^T S_k^{-1}$$

This gain, which is known as the optimal Kalman gain, is the one that may yield MMSE estimates when used.

Simplification of the a Posteriori Error Covariance Formula:

The formula used to calculate the a posteriori error covariance can be simplified when the Kalman gain equals the optimal value derived above. Multiplying both sides of our Kalman gain formula on the right by $S_k K_k^T$, it follows that $$K_k S_k K_k^T = P_{k|k-1} H_k^T K_k^T$$

Referring back to our expanded formula for the a posteriori error covariance, $$P_{k|k} = P_{k|k-1} - K_k H_k P_{k|k-1} - P_{k|k-1} H_k^T K_k^T + K_k S_k K_k^T$$

we find the last two terms cancel out, giving $$P_{k|k}=P_{k|k-1}-K_kH_kP_{k|k-1}=(I-K_kH_k)P_{k|k-1}.$$

This formula is computationally cheaper and thus nearly always used in practice, but may only be correct for the optimal gain. If arithmetic precision is unusually low causing problems with numerical stability, or if a non-optimal Kalman gain is deliberately used, this simplification may not be applied; instead the a posteriori error covariance formula as derived above may be used.

Fixed-Lag Smoother:

The optimal fixed-lag smoother may provide the optimal estimate of $\hat{x}_{k-N|k}$ for a given fixed-lag N using the measurements from $z_1$ to $z_k$. It can be derived using the previous theory via an augmented state, and the main equation of the filter may be the following:

$$\begin{bmatrix}\hat{x}_{t|t}\\ \hat{x}_{t-1|t}\\ \vdots\\ \hat{x}_{t-N+1|t}\end{bmatrix}=\begin{bmatrix}I\\0\\ \vdots\\0\end{bmatrix}\hat{x}_{t|t-1}+\begin{bmatrix}0&\dots&0\\ I&0&\vdots\\ \vdots&\ddots&\vdots\\0&\dots&I\end{bmatrix}\begin{bmatrix}\hat{x}_{t-1|t-1}\\ \hat{x}_{t-2|t-1}\\ \vdots\\ \hat{x}_{t-N+1|t-1}\end{bmatrix}+\begin{bmatrix}K^{(0)}\\K^{(1)}\\ \vdots\\K^{(N-1)}\end{bmatrix}y_{t|t-1}$$

where:

$\hat{x}_{t|t-1}$ is estimated via a standard Kalman filter;

$y_{t|t-1}=z_t-H\hat{x}_{t|t-1}$ is the innovation produced considering the estimate of the standard Kalman filter;

the various $\hat{x}_{t-t|t}$ with t=1, . . . , N−1 are new variables, i.e. they do not appear in the standard Kalman filter;

the gains are computed via the following scheme:

$$K^{(i)}=P^{(i)}H^T[HPH^T+R]^{-1}$$

and $$P^{(i)}=P[[F-KH]^T]^i$$

where P and K are the prediction error covariance and the gains of the standard Kalman filter (i.e., $P_{t|t-1}$).

If the estimation error covariance is defined so that $$P_i:=E[(x_{t-t}-\hat{x}_{t-t|t})^*(x_{t-t}-\hat{x}_{t-1|t})|z_1 \dots z_t],$$

then we have that the improvement on the estimation of $x_{t-t}$ is given by:

$$P-P_i=\sum_{j=0}^{i}\left[P^{(j)}H^T[HPH^T+R]^{-1}H(p^{(i)})^T\right]$$

Although particular features have been shown and described, it will be understood that they are not intended to limit the claimed invention, and it will be made obvious to those skilled in the art that various changes and modifications may be made without departing from the scope of the claimed invention. The specification and drawings are, accordingly to be regarded in an illustrative rather than restrictive sense. The claimed invention is intended to cover all alternatives, modifications and equivalents.

LIST OF REFERENCES

2 hearing device
4 input transducer
6 processing unit
8 output transducer
10 hearing device user
12 left ear input signal zl(n) or noisy signal at the left ear
14 right ear input signal zr(n) or noisy signal at the right ear
16 noise codebook
18 speech codebook
20 distance vector for the left ear consisting of Itakura Saito distances between the noisy spectrum at the left ear and modeled noisy spectrum
22 distance vector for the right ear consisting of Itakura Saito distances between the noisy spectrum at the right ear and modeled noisy spectrum
24 combined weights of the left and right ear
26 modeled noisy spectrum (sum of 16 and 18) left ear
28 modeled noisy spectrum (sum of 16 and 18) right ear
30 spectral envelope left ear
32 spectral envelope right ear
34 Itakura Saito distortion for left ear
36 Itakura Saito distortion for right ear
38 noisy spectrum left ear
40 noisy spectrum right ear
101 providing an input signal z(n) comprising a speech signal and a noise signal
102 performing a codebook based approach processing on the input signal z(n)
103 determining one or more parameters of the input signal z(n) based on the codebook based approach processing in step 102
104 performing a Kalman filtering of the input signal z(n) using the determined one or more parameters from step 103
105 providing that an output signal is speech intelligibility enhanced due to the Kalman filtering in step 104

The invention claimed is:

1. A hearing device for enhancing speech intelligibility, the hearing device comprising:

an input transducer for providing an input signal comprising a speech signal and a noise signal;

a processing unit;

an acoustic output transducer coupled to the processing unit;

wherein the processing unit is configured to determine one or more parameters based on a codebook based approach (CBA) processing;

wherein the processing unit is configured to perform Kalman filtering based on the input signal and the one or more parameters to provide an output signal having an enhanced speech intelligibility; and wherein the acoustic output transducer is configured to provide an audio output signal for hearing by a user of the hearing device based on the output signal with enhanced speech intelligibility.

2. The hearing device according to claim 1, wherein the input signal is divided into one or more frames, the one or more frames comprising primary frames representing speech signals, secondary frames representing noise signals, tertiary frames representing silence, or any combination of the foregoing.

3. The hearing device according to claim 1, wherein the one or more parameters comprise one or a combination of:

a first parameter being a state evolution matrix C(n) comprising of speech Linear Prediction Coefficients (LPC) and noise Linear Prediction Coefficients (LPC), a second parameter being a variance of a speech excitation signal $\sigma_u^2$ (n), and a third parameter being a variance of a noise excitation signal $\sigma_v^2$ (n).

4. The hearing device according to claim 1, wherein the one or more parameters are assumed to be constant over frames of 25 milliseconds.

5. The hearing device according to claim 1, wherein the processing unit is configured to determine the one or more parameters based on a priori information about speech spectral shapes and/or noise spectral shapes stored in a codebook in a form of Linear Prediction Coefficients (LPC).

6. The hearing device according to claim 1, wherein the codebook based approach (CBA) processing involves a generic speech codebook or a speaker specific trained codebook.

7. The hearing device according to claim 1, wherein the code book based approach (CBA) processing involves a speaker specific trained codebook, and wherein the speaker specific trained codebook comprises data based on recording speech of multiple persons.

8. The hearing device according to claim 1, wherein the processing unit is configured to perform the Kalman filtering using a fixed lag Kalman smoother that is configured to provide a minimum mean-square estimator (MMSE) of the speech signal.

9. The hearing device according to claim 1, wherein the processing unit is configured to perform the Kalman filtering based on the input signal by computing an a priori estimate and an a posteriori estimate of a state vector, and an error covariance matrix of the input signal.

10. The hearing device according to claim 1, wherein the processing unit is configured to perform a weighted summation of predictor parameters of the speech signal in a line spectral frequency (LSF) domain.

11. The hearing device according to claim 1, wherein the hearing device is a first hearing device configured to communicate with a second hearing device in a binaural hearing device system configured to be worn by the user.

12. The hearing device according to claim 11, wherein the input transducer comprises a first input transducer, the input signal comprises a left ear input signal, and wherein the first hearing device comprises the first input transducer for providing the left ear input signal;

wherein the second hearing device comprises a second input transducer for providing a right ear input signal comprising a right ear speech signal and a right ear noise signal;

wherein the processing unit comprises a first processing unit, the one or more parameters of the input signal comprises one or more left parameters of the left ear input signal, and wherein the first hearing device comprises the first processing unit configured for determining the one or more left parameters of the left ear input signal based on the codebook based approach (CBA) processing; and wherein the second hearing device comprises a second processing unit configured for determining one or more right parameters of the right ear input signal.

13. The hearing device according to claim 1, wherein the codebook based approach (CBA) processing involves a codebook corresponding to a category of human speaker.

14. The hearing device according to claim 13, wherein category of human speaker comprises a female category, a male category, a child category, or a combination of the foregoing.

15. The hearing device according to claim 13, wherein the category of human speaker comprises a known-person category.

16. The hearing device according to claim 1, wherein the codebook based approach (CBA) processing involves a codebook corresponding to a category of speech-source.

17. The hearing device according to claim 1, wherein the hearing device is configured for worn by the user.

18. A hearing device for enhancing speech intelligibility, the hearing device comprising:

an input transducer for providing an input signal comprising a speech signal and a noise signal;

a processing unit;

an acoustic output transducer coupled to the processing unit;

wherein the processing unit is configured to determine one or more parameters based on a codebook based approach (CBA) processing;

wherein the processing unit is configured to perform Kalman filtering based on the input signal and the one or more parameters to provide an output signal having an enhanced speech intelligibility;

wherein the acoustic output transducer is configured to provide an audio output signal for hearing by a user of the hearing device based on the output signal with enhanced speech intelligibility; and wherein the one or more parameters comprise one or more predictor parameters, and wherein the Kalman filtering is performed based on the one or more predictor parameters.

19. A hearing device for enhancing speech intelligibility, the hearing device comprising:

an input transducer for providing an input signal comprising a speech signal and a noise signal;

a processing unit;

an acoustic output transducer coupled to the processing unit;

wherein the processing unit is configured to determine one or more parameters based on a codebook based approach (CBA) processing;

wherein the processing unit is configured to perform Kalman filtering based on the input signal and the one or more parameters to provide an output signal having an enhanced speech intelligibility;

wherein the acoustic output transducer is configured to provide an audio output signal for hearing by a user of the hearing device based on the output signal with enhanced speech intelligibility; and wherein the processing unit is configured to automatically select a codebook for the codebook based approach (CBA) processing from a plurality of available codebooks, and wherein the processing unit is configured to automatically select the codebook based on a spectra of the input signal and/or based on a measurement of objective intelligibility for each of the available codebooks.

20. A method for enhancing speech intelligibility in a hearing device, the method comprising:

providing an input signal comprising a speech signal and a noise signal;

determining, using a processing unit, one or more parameters of the input signal based on a codebook based approach (CBA) processing;

performing, using the processing unit, Kalman filtering based on the input signal and the one or more parameters to generate an output signal that has an enhanced speech intelligibility; and providing an audio output signal by an acoustic output transducer for hearing by a user of the hearing device based on the output signal.

21. The method according to claim 20, wherein the hearing device is configured for worn by the user.

* * * * *